United States Patent [19]

Pawsat

[11] Patent Number: 4,526,491
[45] Date of Patent: Jul. 2, 1985

[54] BICYCLE HANDLEBAR STEM ASSEMBLY

[75] Inventor: Dennis P. Pawsat, Maysville, Ky.

[73] Assignee: Wald Manufacturing Company, Inc., Maysville, Ky.

[21] Appl. No.: 341,314

[22] Filed: Jan. 21, 1982

[51] Int. Cl.³ .............................................. B62K 21/22
[52] U.S. Cl. ..................... 403/24; 403/271; 74/551.1; 280/279; 228/174
[58] Field of Search ............. 74/551.1, 551.6; 280/279, 280; 228/174, 214; 403/271, 24

[56] References Cited

U.S. PATENT DOCUMENTS

| | | | |
|---|---|---|---|
| 3,718,107 | 2/1973 | Bartels | 228/174 X |
| 4,322,087 | 3/1982 | Addicks | 280/279 |
| 4,337,962 | 7/1982 | Allen | 280/279 |

FOREIGN PATENT DOCUMENTS 69552  6/1979  Japan .................. 228/174

Primary Examiner—Andrew V. Kundrat
Attorney, Agent, or Firm—Wood, Herron & Evans

[57] ABSTRACT

A handlebar stem assembly is provided for securing the handlebars to the frame of a motocross bicycle consisting of top and bottom plates formed with arcuate grooves to receive and secure the handlebars therebetween. The bottom plate is welded to a stem which attaches to the bicycle frame, and at least one generally arcuate shaped relief opening is formed in the bottom plate adjacent its welded connection to the stem for reducing the stress concentration at such connection.

28 Claims, 4 Drawing Figures

BICYCLE HANDLEBAR STEM ASSEMBLY

FIELD OF THE INVENTION

The subject invention relates to the field of bicycles, and, more particularly, to an improved, relatively inexpensive means of securing the handlebars to the frame of a motocross bicycle.

BACKGROUND OF THE INVENTION

In recent years, the sport of motocross racing has found increasingly wide acceptance in this country and others. While once primarily intended for motorcycle racing, motocross events for bicycles have become more common with the development of sanctioned tracks and independent bicycle motocross layouts. As is well known, motocross racing for either motorcycles or bicycles is conducted over courses having any number of sharp turns, bumps, jumps, grades, and other obstacles. It can be appreciated that every element of a cycle intended for motocross racing must be extremely durable.

It has been found that one area of particular stress concentration in motorcross bicycles is in the handlebar stem assembly which secures the handlebars to the frame. During normal racing of a motocross bicycle, or even in off-track use, the front wheel of the bicycle is alternately lifted from the ground by pulling the handlebars upwardly and then returned to the ground as the rider shifts his or her weight forward. Such motion occurs during racing as the bicycles encounter bumps or jumps, and in off-track use riders frequently do a "wheely" or ride on only the rear tire for short periods. The structure which secures the handlebars to the frame is thus subjected to repeated tensile and compressive loads, with the compressive loads being particularly high when the rider leans forward as the front wheel contacts the ground.

Traditionally, the handlebars of a bicycle have been connected to the frame by a simple bracket consisting of a tubular-shaped flange through which the handlebars are disposed and held in place by a single bolt. It can be appreciated that this construction proved to be completely unsatisfactory for motocross bicycles. In fact, to obtain the necessary strength, a four-bolt handlebar stem assembly was designed for use in such bicycles.

Generally, a handlebar stem assembly for motocross bicycles consists of a top plate and bottom plate which are essentially square in configuration and secured together by a bolt and nut connection at each of the four corners. The top and bottom plates are each formed with an arcuate groove through which the handlebar is disposed. The handlebar is secured in place by tightening the bolts which connect the top and bottom plates. Welded to the bottom plate is a tubular stem which extends downwardly at an angle into engagement with the frame of the bicycle for securing the handlebar stem assembly in place.

It is apparent that the alternating tensile and compressive forces created by lifting the front wheel from the ground and then lowering it back again are transmitted directly to the welded connection between the bottom plate and stem. In addition, tensile forces are applied to the welded connection between the bottom plate and stem as the bolts which secure the handlebar in place between the top and bottom plates are tightened. These bolts in effect impose a tensile pre-stress on the handlebar stem assembly which must also be accommodated in the connection between the bottom plate and stem.

It has been found that the tensile pre-stress applied to the handlebar stem assembly and the alternating tensile and compressive loads applied thereto during normal use of the bicycle create a substantial stress concentration at the welded connection between the bottom plate and stem at the inwardly extending edge of the stem where it forms an angle with the bottom plate. Fatigue cracks on the bottom plate along the welded connection to the stem may occur as a result of the stress concentration, leading to premature failure of the handlebar stem assembly.

To avoid this problem, several prior art solutions have been proposed. One approach has been to weld a gusset between the bottom plate and stem to relieve the stress concentration. Another solution to the problem found in the prior art is the use of a heat treated bottom plate which is welded to the stem. While both prior art designs appear to solve the problem of premature stress failure in the bottom plate, both do so at a cost which has been found to be excessive for many applications. In fact, it is believed that the expense required to produce a handlebar stem assembly using either a gusset or a heat treated bottom plate would be prohibitive for many applications if prices are to be competitive with foreign imports.

It has therefore been an object of this invention to provide a handlebar stem assembly which has acceptable fatigue life and which may be manufactured for substantially less than guessets or heat treated stems.

SUMMARY OF THE INVENTION

The handlebar stem assembly according to this invention includes essentially the same four bolt connection between the top and bottom plates as found in the prior art, but with a bottom plate made of economical mild steel formed with an arcuate-shaped opening along at least a portion of the welded connection between the stem and bottom plate. Such an opening effectively relieves the stress concentration in the bottom plate at that point and substantially extends the fatigue life of the stem over the same stem but without the stress concentration relief opening in the bottom plate.

DESCRIPTION OF THE DRAWINGS

The structure, operation and advantages of this invention will become apparent upon consideration of the following discussion taken in conjunction with the accompanying drawings, wherein.

DETAILED DESCRIPTION OF THE INVENTION

Figure 1:
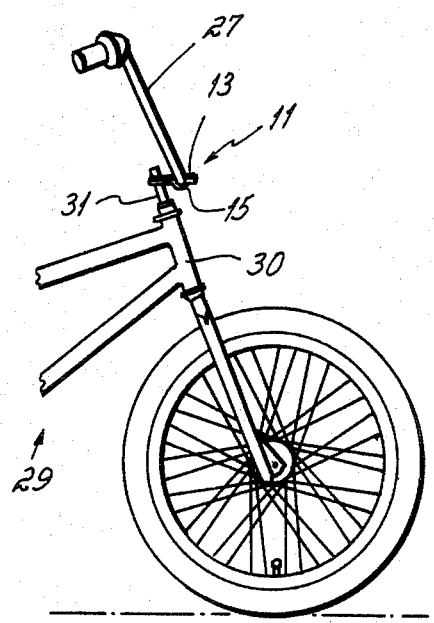
FIG. 1 is a perspective view of a motocross bicycle having the handlebar stem assembly of the subject invention.

Referring now to the drawings, the handlebar stem assembly of the subject invention is labeled generally with the reference 11. Assembly 11 includes a top plate 13 and bottom plate 15 which are formed with aligning holes 17 at each corner. A bolt 19 is disposed through each of the holes 17 and extends through the top and bottom plates 13 and 15 to receive a washer 21 and nut 23. The top and bottom plates 13 and 15 are formed with an arcuate groove 25 and 25a respectively, which are sized to receive the handlebar 27 of the bicycle 29. The handlebar 27 is disposed within the arcuate grooves 25 and 25a and secured in place with the axis 27a of the handlebar midway between top and bottom plates 13 and 15 by tightening each of the four nuts 23.

Figure 2:
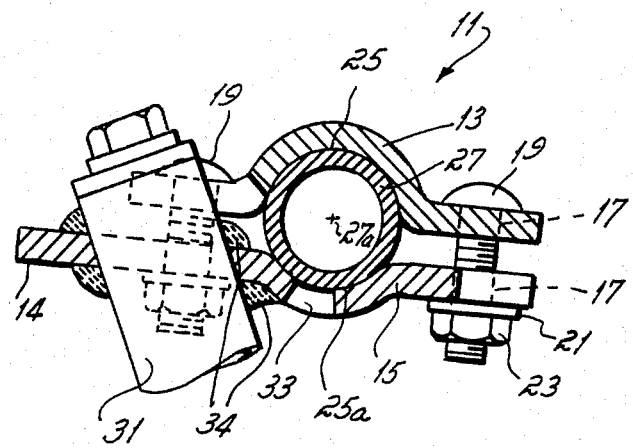
FIG. 2 is a partial, enlarged cross-sectional view of the handlebar stem assembly herein.
Figure 3:
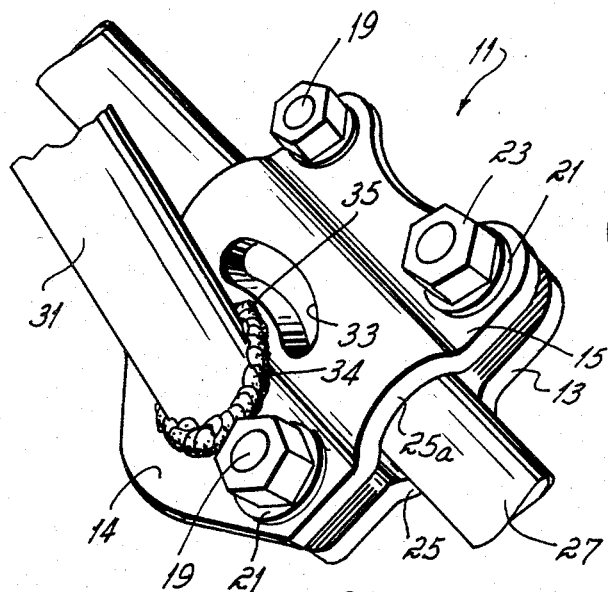
FIG. 3 is a view of the base of the handlebar stem assembly showing the arcuate relief opening for reducing the stress concentration applied to the bottom plate.
Figure 4:
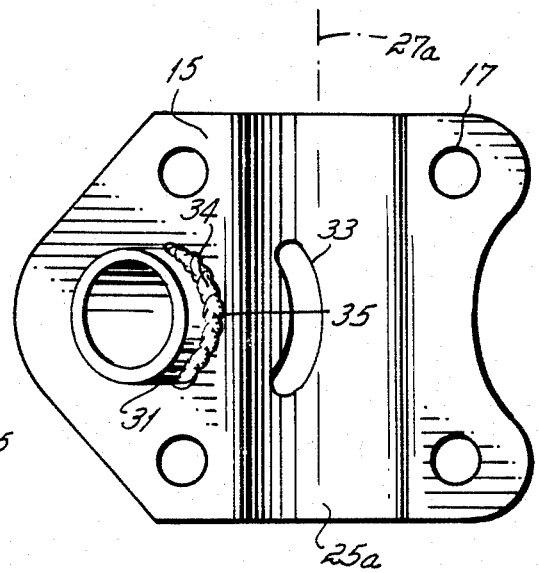
FIG. 4 is a top plan view of the bottom plate of the assembly of FIG. 2 with the mounting stem welded thereto.

As shown in FIGS. 2 and 3, handlebar stem assembly 11 further includes a stem 31 which is welded to the underside 14 of bottom plate 15 and extends downwardly at an angle to a point of connection with the frame 30 of bicycle 29. The bicycle 29 is primarily intended for use for motocross-type racing in which relatively high alternating tensile and compressive stresses are applied to the stem assembly 11 as the front wheel of the bicycle 29 is raised and lowered from the ground. In addition to the stresses developed while the bicycle 29 is being utilized, there is a tensile pre-stress applied to the welded connection between the stem 31 and bottom plate 15 which is created by tightening the nuts 23 to secure the handlebars 27 in place. The combined effect of the alternating tensile and compressive operating stresses, and the tensile pre-stress applied during assembly, creates a stress concentration in the bottom plate at a location adjacent a point 35 in the weld 34. The point 35 in the weld adjacent which the stress is most concentrated in the bottom plate is the point of the weld which is closest to the centerline 27a of the handlebar 27. This centerline 27a is also the centerline of the arcuate grooves 25, 25a of the top and bottom plates 13, 15 respectively.

The stem assembly 11 of the subject invention reduces the stress concentration in the bottom plate 15 along the weld 34 at the point where it is the greatest and thus most subject to cause failure of the bottom plate. In the preferred embodiment as shown in FIGS. 2 and 3, an arcuate opening 22 is formed in bottom plate 15 and extends along the line of the weld 34 between the stem 31 and bottom plate 15 from the point 35 of the stem 31 and outwardly in each direction therefrom along the weld 34. It should be understood that while opening 33 is shown as having a relatively short, generally arcuate or kidney-shape, other configurations of opening 33 which relieve the stress concentration along the weld 34 at the intersection between the stem 31 and bottom plate 15 are also within the scope of the subject invention. For example, a somewhat longer arcuate-shaped opening has also been found to improve the fatigue life of the product as compared to a solid bottom plate 15. In addition, two or more spaced separate openings in bottom plate 31 along the weld 34 have also been found to improve performance over a solid bottom plate 31. However, these other shapes of openings have been found to have a fatigue life without failure which is less than a bottom plate 31 having the kidney-shape arcuate opening 33 of the preferred embodiment illustrated in the drawings.

The tests mentioned above have confirmed that by introducing the arcuate opening 33 along the welded connection between the bottom plate 15 and stem 31, the stress concentration at that point is substantially reduced without weakening of the overall strength of the welded connection. Moreover, the arcuate opening 33 may be routinely punched into the bottom plate 15 before, after, or while the stamping operation to form the bottom plate 15 is completed. Therefore, the problem of stress concentration in handlebar stem assemblies is solved effectively and inexpensively by the subject invention as compared to prior art gusset and heat treated steel configurations.

While the invention has been shown in regards to a preferred embodiment, persons skilled in the art to which this invention pertains will readily appreciate modifications and changes which may be made without departing from the spirit of the invention. For example, I have described the invention in relation to a motocross bicycle but it is equally applicable to conventional "cruiser" bicycles or other bicycles intended for heavy duty use. Therefore, I do not intend to be limited except by the scope of the appended claims:

Thus, having described the invention, what is claimed is:

1. A handlebar stem assembly for securing the handlebar of a bicycle to the frame thereof comprising a top plate and a bottom plate each formed to receive said handlebar, said top and bottom plates each having a top surface and a bottom surface, means for connecting said top and bottom plates together, stem means connected by a welded connection at one end to said bottom plate and adapted to be connected at the other end to said bicycle frame, means for reducing stress concentration in said bottom plate, said stress concentration reducing means comprising an aperture formed in said bottom plate adjacent said welded connection with said stem means, said handlebar being adapted to be secured between said plates on one side of said bottom plate offset from said welded connection, said one side of said bottom plate having a side edge extending between said top and bottom surface of said bottom plate, and said aperture being located between said welded connection and said side edge on said one side of said bottom plate and being spaced from said side edge.

2. The handlebar stem assembly of claim 1 wherein said top and bottom plates are each formed with an arcuate groove to receive said handlebar therein.

3. The handlebar stem assembly of claim 1 wherein said means for connecting said top and bottom plates together for securing said handlebar therebetween includes bores formed in each of four corners of said top and bottom plates, and bolts insertable through said bores for securing said handlebar between said top and bottom plates.

4. The handlebar stem assembly of claim 1 wherein said handlebar has a centerline, said welded connection of said stem means to said bottom plate having one point in its welded connection which is nearest the centerline of the handlebar, said stress concentration reducing aperture in said bottom plate being located adjacent said one point of said welded connection.

5. The handlebar stem assembly of claim 4 wherein said aperture is generally arcuate in configuration and extending generally parallel to said weld, said arcuate aperture having a midpoint located adjacent said one point of said welded connection.

6. A handlebar stem assembly for securing the handlebar of a bicycle to the frame thereof comprising a top plate having an arcuate groove and being formed with a bore at each corner, a bottom plate having an arcuate groove and being formed with a bore at each corner in alignment with said bores of said top plate, bolt means insertable through said bores of said top and bottom plates and being adapted to be tightened so as to secure said handlebar between said arcuate grooves of said top and bottom plates, stem means connected by a welded connection to said bottom plate at a location offset on one side from said arcuate groove of said bottom plate, said stem means being adapted to be attached to said bicycle frame, and means for relieving stress concentration in said bottom plate, said stress concentration relieving means comprising an aperture formed in said bottom plate immediately adjacent at least a portion of the welded connection between said stem and said bottom plate, and at least a portion of said aperture being located in said handlebar receiving arcuate groove of said bottom plate.

7. The handlebar stem assembly of claim 6 wherein said aperture in said bottom plate is generally arcuate in configuration and extends outwardly in opposite directions from a midpoint, said welded connection having one point in the connection which is located nearest the centerline of the handlebar, and said midpoint of said arcuate aperture being located adjacent said one point of said welded connection.

8. The handlebar assembly of claim 7 in which arcuate aperture extends generally parallel to said welded connection.

9. A handlebar stem assembly for securing the handlebar of a bicycle to the frame thereof comprising a top plate having a central, arcuate groove and being formed with a bore at each corner, a bottom plate having a central, arcuate groove and being formed with a bore at each corner in alignment with said bores of said top plate, bolt means insertable through said aligning bores of said top and bottom plates and adapted to be tightened to secure the handlebar between said arcuate grooves of said top and bottom plates, stem means connected by a welded connection to said bottom plate and adapted to be attached to said bicycle frame, and means for relieving stress concentration in said bottom plate, said stress relieving means comprising an aperture formed in said bottom plate and at least a portion of said aperture being located in said handlebar receiving arcuate groove of said bottom plate.

10. The handlebar stem of claim 9 in which said aperture is arcuate in configuration and is located adjacent said welded connection.

11. The handlebar stem of claim 10 in which said arcuate aperture extends generally parallel said welded connection.

12. A handlebar stem assembly for securing the handlebar of a bicycle to the frame thereof comprising a bottom plate formed with an arcuate groove to receive said handlebar, said bottom plate having a top and bottom surface, top securing means adapted to receive said handlebar, means for connecting said top securing means and said bottom plate together so as to clamp said handlebar therebetween, stem means connected by a welded connection to said bottom plate, and means for relieving stress concentration in said bottom plate, said stress relieving means comprising an aperture formed in said bottom plate adjacent said welded connection, said handlebar being adapted to be secured between said bottom plate and said top securing means on one side of said bottom plate offset from said welded connection, said one side of said bottom plate having a side edge extending between said top and bottom surfaces of said bottom plate, and said aperture being located between said welded connection and said side edge on said one side of said bottom plate and being spaced from said side edge.

13. The handlebar stem of claim 12 in which said aperture is generally arcuate in configuration and extends generally parallel to said welded connection.

14. The handlebar stem of claim 12 in which said welded connection has one point in the connection which is located nearest said arcuate groove, said aperture being located adjacent to said one point in said connection.

15. A handlebar stem assembly for securing the handlebar of a bicycle to the frame thereof comprising a top plate and a bottom plate, each of said plates having a groove formed to receive a handlebar, said handlebar receiving grooves having a centerline, means for connecting said top and bottom plates together for securing said handlebar therebetween, stem means connected by a welded connection at one end to said bottom plate and adapted to be connected at the other end to said bicycle frame, means for reducing stress concentration in said bottom plate, said stress concentration reducing means comprising an opening formed in said bottom plate adjacent said welded connection with said stem means, said welded connection of said stem means to said bottom plate having one point in the welded connection which is nearest said centerline of the handlebar receiving grooves, said stress reducing opening in said bottom plate having at least a portion located adjacent said one point of said welded connection, said portion of said opening being generally arcuate in configuration and generally following the contour of said welded connection between said bottom plate and stem.

16. A handlebar stem assembly for securing the handlebar of a bicycle to the frame thereof comprising a top plate and a bottom plate each formed with a transverse arcuate groove adapted to receive said handlebar therebetween, means for connecting said top and bottom plates together for securing said handlebar between said transverse arcuate grooves, stem means connected at one end by a welded connection to said bottom plate and adapted to be connected at the other end to said bicycle frame, means for reducing stress concentration in said bottom plate, said stress concentration reducing means comprising an opening formed in said bottom plate, said opening being at least partially located within said transverse arcuate groove of said bottom plate and being generally kidney-shaped and wrapped about said welded connection with said stem means.

17. The handlebar stem assembly of claim 16 wherein said means for connecting said top and bottom plates together for securing said handlebar therebetween includes bores formed in each of four corners of said top and bottom plates, and bolts insertable through said bores for securing said handlebar between said top and bottom plates.

18. The handlebar stem assembly of claim 16 wherein said opening has a surface which is generally arcuate in configuration and which extends parallel to said welded connection of said bottom plate to said stem.

19. The handlebar stem assembly of claim 16 wherein said handlebar has a centerline, said welded connection of said stem means to said bottom plate having one point in its welded connection which is nearest the centerline of the handlebar, said stress concentration reducing opening in said bottom plate having at least a portion of said opening located in close adjacency to said one point of said welded connection.

20. The handlebar stem assembly of claim 19 wherein said opening is generally arcuate in configuration and extends generally parallel to said weld, said arcuate opening having a midpoint located adjacent said one point of said welded connection.

21. A handlebar stem assembly for securing a handlebar of a bicycle to the frame, said assembly comprising a top plate having an arcuate handlebar receiving groove and being formed with a bore at each corner, a bottom plate having an arcuate handlebar receiving groove and being formed with a bore at each corner in alignment with said bores of said top plate, each of said grooves having a centerline, bolt means insertable through said bores of said top and bottom plates and being adapted to be tightened so as to secure a bicycle handlebar between said arcuate grooves of said top and bottom plates, stem means connected by a welded connection to said bottom plate, said stem means being adapted to be attached to said bicycle frame, said welded connection having one point in the connection which is located nearest the centerline of the handlebar receiving groove in said bottom plate, and means for relieving stress concentration in said bottom plate, said stress concentration relieving means comprising an opening formed in said bottom plate, at least a portion of said opening being generally kidney-shaped and wrapped about said one point in said welded connection between said stem and said bottom plate.

22. The handlebar stem assembly of claim 21 wherein said kidney-shaped portion of said opening in said bottom plate extends outwardly in opposite directions from a midpoint, said midpoint of said opening being located adjacent said one point of said welded connection.

23. The handlebar assembly of claim 22 in which a kidney-shaped portion of said opening extends generally parallel to said welded connection.

24. A handlebar stem assembly for securing the handlebar of a bicycle to the frame thereof comprising a top plate having a handlebar receiving arcuate groove and being formed with a bore at each corner, a bottom plate having a handlebar receiving arcuate groove and being formed with a bore at each corner in alignment with said bores of said top plate, bolt means insertable through said aligning bores of said top and bottom plates and being adapted to be tightened so as to secure the handlebar between said arcuate grooves of said top and bottom plates, stem means connected by a welded connection to said bottom plate and adapted to be attached to said bicycle frame, and means for relieving stress concentration in said bottom plate, said stress concentration relieving means comprising a generally kidney-shaped opening formed in said bottom plate, at least a portion of said opening being located within said arcuate groove of said bottom plate.

25. The handlebar stem of claim 24 in which at least a portion of said opening is arcuate in configuration and is located adjacent said welded connection.

26. The handlebar stem of claim 25 in which said arcuate portion of said opening extends generally parallel to said welded connection.

27. A handlebar stem assembly for securing the handlebar of a bicycle to the frame thereof comprising a bottom plate formed with an arcuate groove to relieve said handlebar, top securing means adapted to receive said handlebar, means for connecting said top securing means and said bottom plate together so as to clamp said handlebar therebetween, stem means connected by a welded connection to said bottom plate, and means for relieving stress concentration in said bottom plate, said stress concentration relieving means comprising an opening formed in said bottom plate adjacent said welded connection, at least a portion of the peripheral surface of said opening being generally arcuate in configuration and extending generally parallel to said welded connection, and at least a portion of said opening being located within said arcuate groove of said bottom plate.

28. The handlebar stem assembly of claim 27 in which said welded connection has one point in the connection which is located nearest said arcuate groove, said arcuate portion of said opening being located adjacent to said one point in said connection.

* * * * *

UNITED STATES PATENT AND TRADEMARK OFFICE
CERTIFICATE OF CORRECTION

PATENT NO. :      4,526,491
DATED        :      July 2, 1985
INVENTOR(S) :   Dennis P. Pawsat It is certified that error appears in the above-identified patent and that said Letters Patent is hereby corrected as shown below:

Column 3, line 41, "22" should be -- 33 --

Signed and Sealed this

Eighth Day of October 1985

[SEAL]

Attest:

DONALD J. QUIGG

Attesting Officer

Commissioner of Patents and
Trademarks—Designate